United States Patent
Chen et al.

(10) Patent No.: US 8,244,182 B2
(45) Date of Patent: Aug. 14, 2012

(54) ELECTRONIC DEVICE AND METHOD FOR LISTENING TO FM RADIO USING A BLUETOOTH DEVICE COMMUNICATING WITH THE ELECTRONIC DEVICE

(75) Inventors: Mien-Chih Chen, Taoyuan (TW); Chi-Hui Fang, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 243 days.

(21) Appl. No.: 12/617,885

(22) Filed: Nov. 13, 2009

(65) Prior Publication Data

US 2010/0248629 A1 Sep. 30, 2010

(30) Foreign Application Priority Data

Mar. 25, 2009 (CN) .......................... 2009 1 0301138

(51) Int. Cl.
*H04B 7/00* (2006.01)
*H04B 1/38* (2006.01)
(52) U.S. Cl. ...................... 455/41.2; 455/90.1; 455/90.2
(58) Field of Classification Search ................. 455/41.2, 455/41.3, 550.1, 556.1, 90.1, 90.2
See application file for complete search history.

(56) References Cited

U.S. PATENT DOCUMENTS

| | | | |
|---|---|---|---|
| 2006/0270346 A1 | 11/2006 | Ibrahim et al. | |
| 2006/0270347 A1* | 11/2006 | Ibrahim et al. | 455/41.2 |
| 2006/0270373 A1* | 11/2006 | So | 455/306 |
| 2007/0124526 A1* | 5/2007 | Sinai | 710/306 |
| 2007/0206827 A1* | 9/2007 | Tupman et al. | 381/334 |
| 2007/0298833 A1* | 12/2007 | Rofougaran et al. | 455/552.1 |
| 2008/0215343 A1* | 9/2008 | Goto et al. | 704/500 |
| 2008/0233876 A1* | 9/2008 | Marholev | 455/41.2 |
| 2009/0082890 A1* | 3/2009 | Griffin, Jr. | 700/94 |
| 2009/0100481 A1* | 4/2009 | Liu et al. | 725/105 |
| 2009/0132240 A1* | 5/2009 | Zinser et al. | 704/201 |
| 2009/0264149 A1* | 10/2009 | Miller et al. | 455/552.1 |
| 2011/0124300 A1 | 5/2011 | Sinai | |

FOREIGN PATENT DOCUMENTS

| | | |
|---|---|---|
| TW | 200721704 | 6/2007 |
| TW | 200803426 | 1/2008 |

* cited by examiner

*Primary Examiner* — Andrew Wendell
(74) *Attorney, Agent, or Firm* — Altis Law Group, Inc.

(57) ABSTRACT

A method for listening to frequency modulation (FM) radio using a Bluetooth device receives analog audio signals from an FM chip and converts the analog audio signals into digital audio signals. The method further records audio files according to the digital audio signals and plays the audio files synchronously to generate audio data, and outputs the audio data to a Bluetooth chip which communicates with the Bluetooth device wirelessly.

12 Claims, 4 Drawing Sheets

ELECTRONIC DEVICE AND METHOD FOR LISTENING TO FM RADIO USING A BLUETOOTH DEVICE COMMUNICATING WITH THE ELECTRONIC DEVICE

BACKGROUND

1. Technical Field

Embodiments of the present disclosure generally relate to electronic devices and methods for processing signals using the electronic devices, and more particularly to an electronic device and a method for processing frequency modulation (FM) signals using the electronic device.

2. Description of Related Art

In the past, people usually like to listen to frequency modulation (FM) broadcasts (hereinafter referred to as "FM radio). Nowadays, most mobile phone manufacturers combine mobile phones with FM function, so that the mobile phones are capable of receiving FM radio besides telephone communication to cater to the need of people. Thus, conventional radios have almost been replaced by the mobile phones.

At present, a mobile phone must be equipped with a pair of external earphones that serve as an FM antenna to transmit audio signals. When using the FM function of the mobile phone, people should firstly insert the pair of earphones into earphone jacks of the mobile phone, so as to receive and listen to the FM radio.

However, the above-mentioned method may be awkward because wires of the earphones may get tangled, and people may often misplace the wires.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
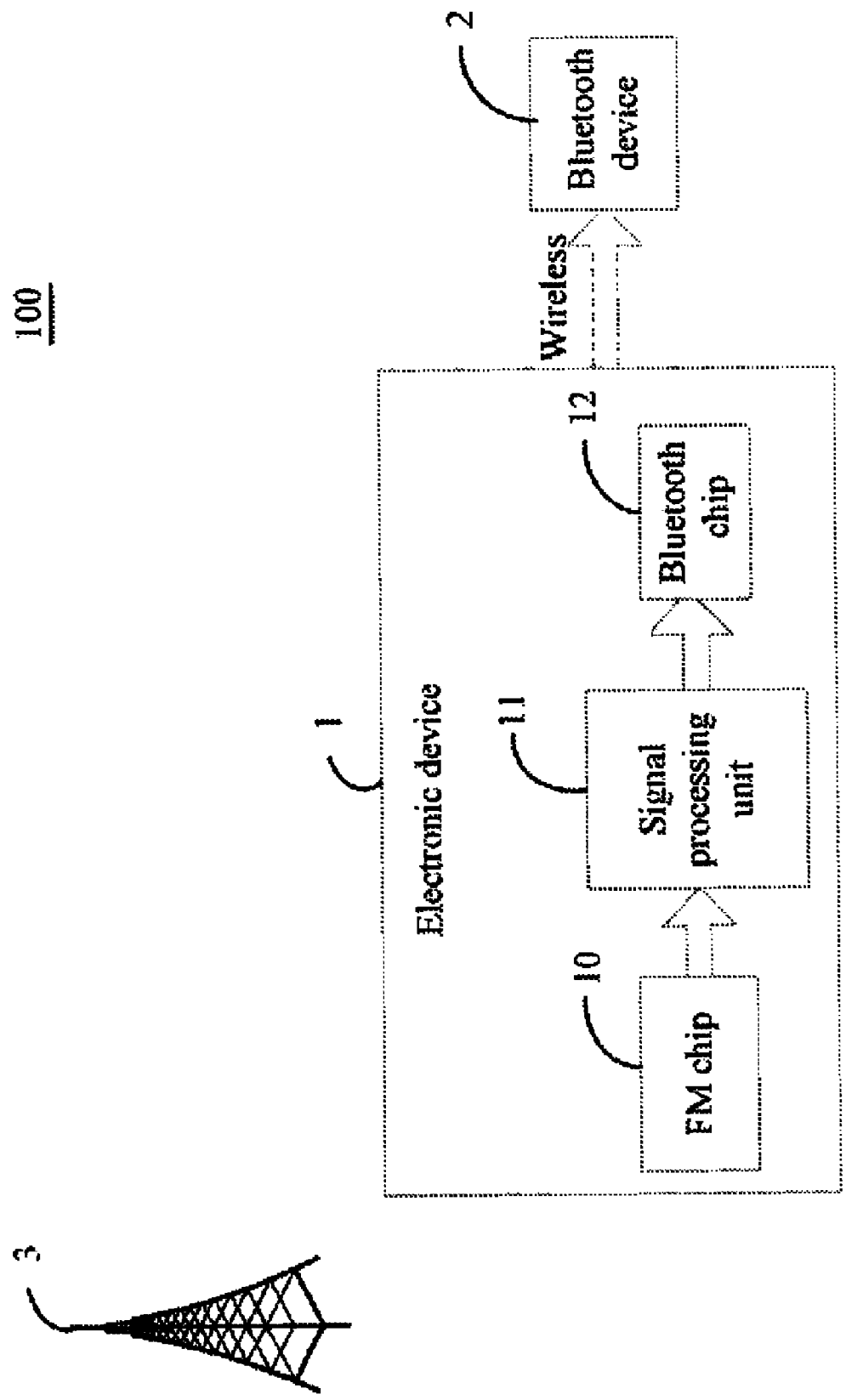
FIG. 1 is a block diagram of one embodiment of a system for listening to FM radio using a Bluetooth device.
Figure 2:
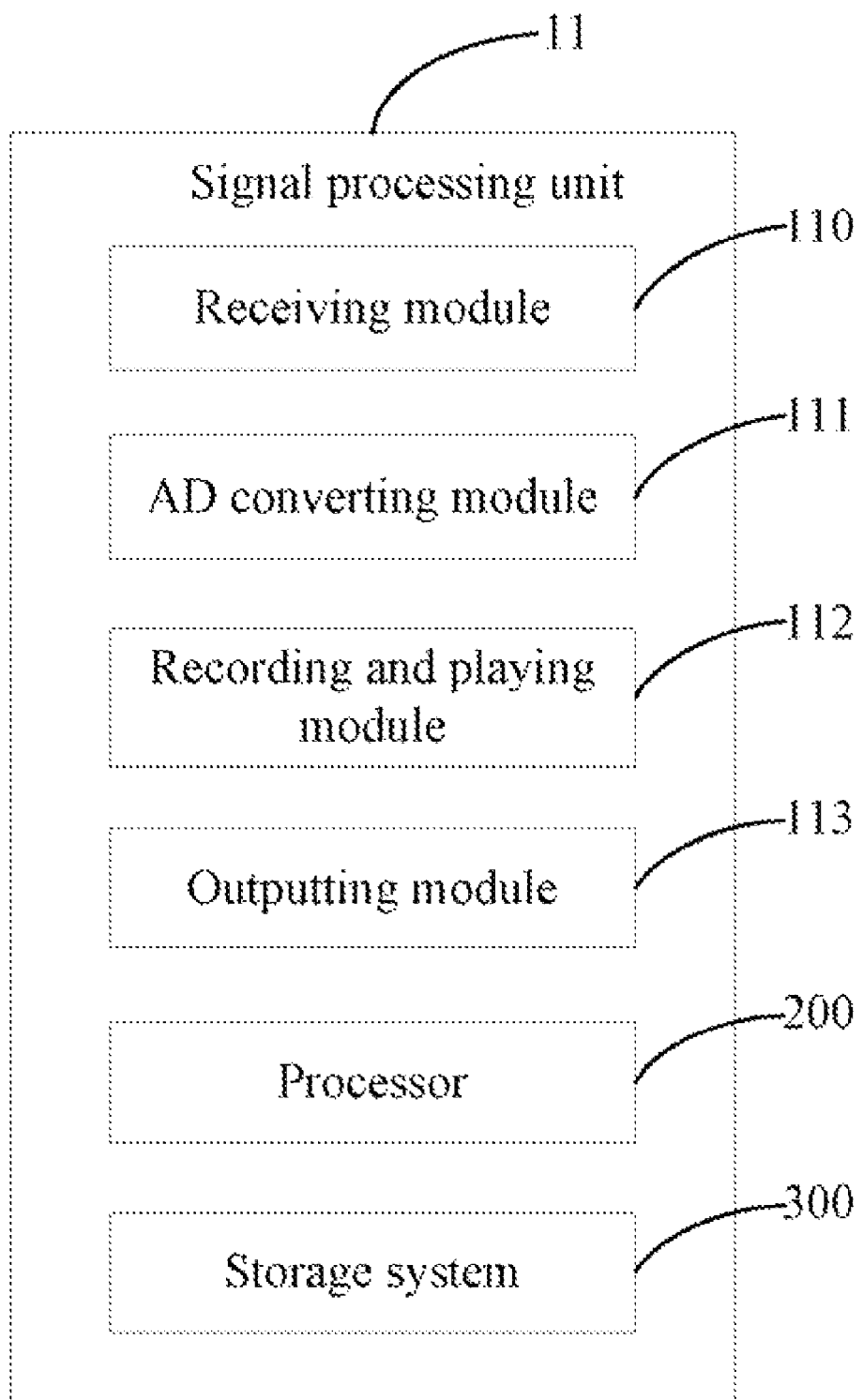
FIG. 2 is a block diagram of one embodiment of function modules of a signal processing unit of FIG. 1.

FIG. 1 is a block diagram of one embodiment of a system 100 for listening to FM radio using a Bluetooth device 2. In one embodiment, the system 100 includes an electronic device 1 and the Bluetooth device 2. The electronic device 1 may be a mobile phone, a notebook computer, for example. The Bluetooth device 2 may be an advanced audio distribution profile (A2DP) Bluetooth headset, for example.

The electronic device 1 includes a frequency modulation (FM) chip 10, a signal processing unit 11, and a Bluetooth chip 12. The FM chip 10 can capture FM signals from a broadcasting station 3, convert the FM signals into analog audio signals, and transmit the analog audio signals to the signal processing unit 11. The signal processing unit 11 includes a plurality of modules (see below descriptions) operable to process the analog audio signals to generate audio data and output the audio data to the Bluetooth chip 12. The Bluetooth chip 12 communicates with the Bluetooth device 2 wirelessly, so as to transmit the audio data to the Bluetooth device 2 for the output of FM radio.

The function modules of the signal processing unit 11 may include a receiving module 110, an analog/digital (AD) converting module 111, a recording and playing module 112, and an outputting module 113. In one embodiment, at least one processor 200 of the signal processing unit 11 executes one or more computerized codes of the modules 110-113 to listen to FM radio using the Bluetooth device 2. The one or more computerized codes of the functional modules 110-113 may be stored in a storage system 300 of the signal processing unit 11.

The receiving module 110 is operable to receive the analog audio signals from the FM chip 10.

The AD converting module 111 is operable to convert the analog audio signals into digital audio signals. In one embodiment, the AD converting module 111 may be an analog-to-digital converter (ADC).

The recording and playing module 112 is operable to record audio files according to the digital audio signals and play the audio files to generate audio data, referring to FIG. 3, described below.

Figure 3:
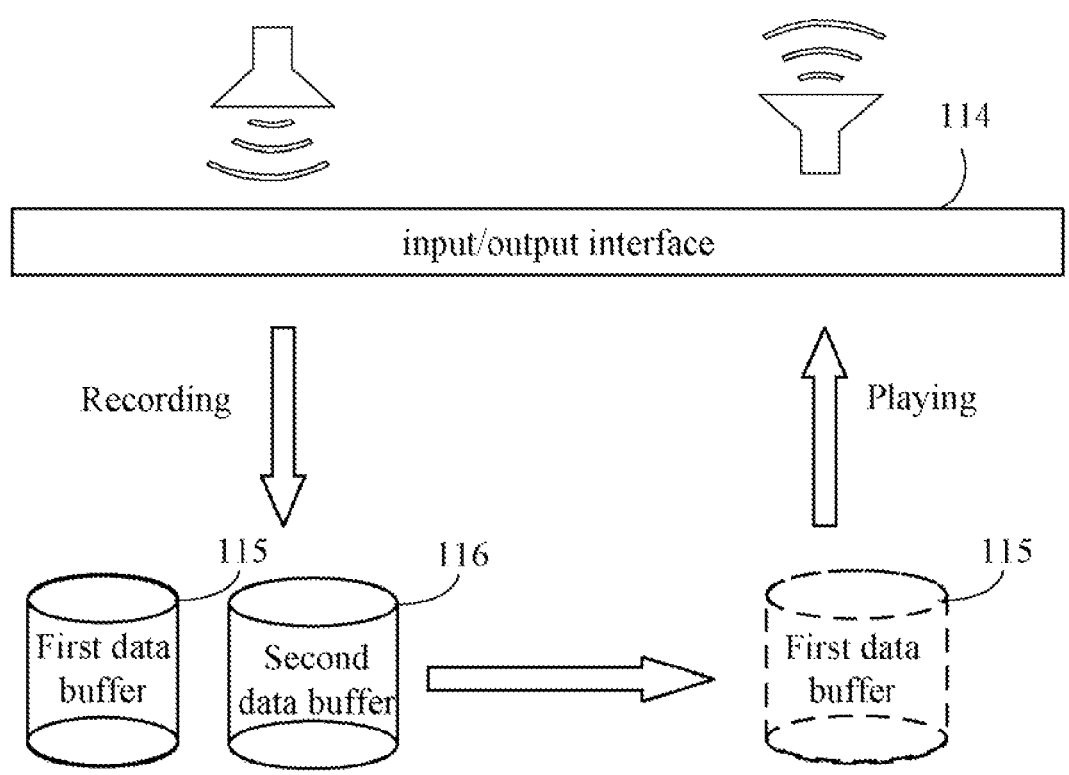
FIG. 3 is a schematic diagram illustrating how does a recording and playing module of FIG. 1 records audio files and play the audio files.

FIG. 3 is a schematic diagram illustrating how does a recording and playing module of FIG. 1 records audio files and play the audio files. In one embodiment, the recording and playing module 112 includes an input/output interface 114, a first data buffer 115, and a second data buffer 116. As illustration, after receiving the digital audio signals from the AD converting module 111 via the input/output interface 114, the recording and playing module 112 firstly records audio files by registering the digital audio signals into the first data buffer 115. At the same time, the recording and playing module 112 plays the audio files recorded in the first data buffer 115 to generate audio data, and outputs the audio data via the input/output interface 114 to the outputting module 113. When the first data buffer 115 is full, the recording and playing module 112 continues to record audio files by registering the digital audio signals into the second data buffer 116. When the audio files recorded in the first data buffer 115 have been played, the recording and playing module 112 plays the audio files recorded in the second data buffer 116 immediately. When the second data buffer 116 is full, the recording and playing module 112 continues to record audio files by registering the digital audio signals into the first data buffer 115 over again. The first data buffer 115 and the second data buffer 116 may use memory in the storage system 300.

The outputting module 113 is operable to output the audio data to the Bluetooth chip 12.

Figure 4:
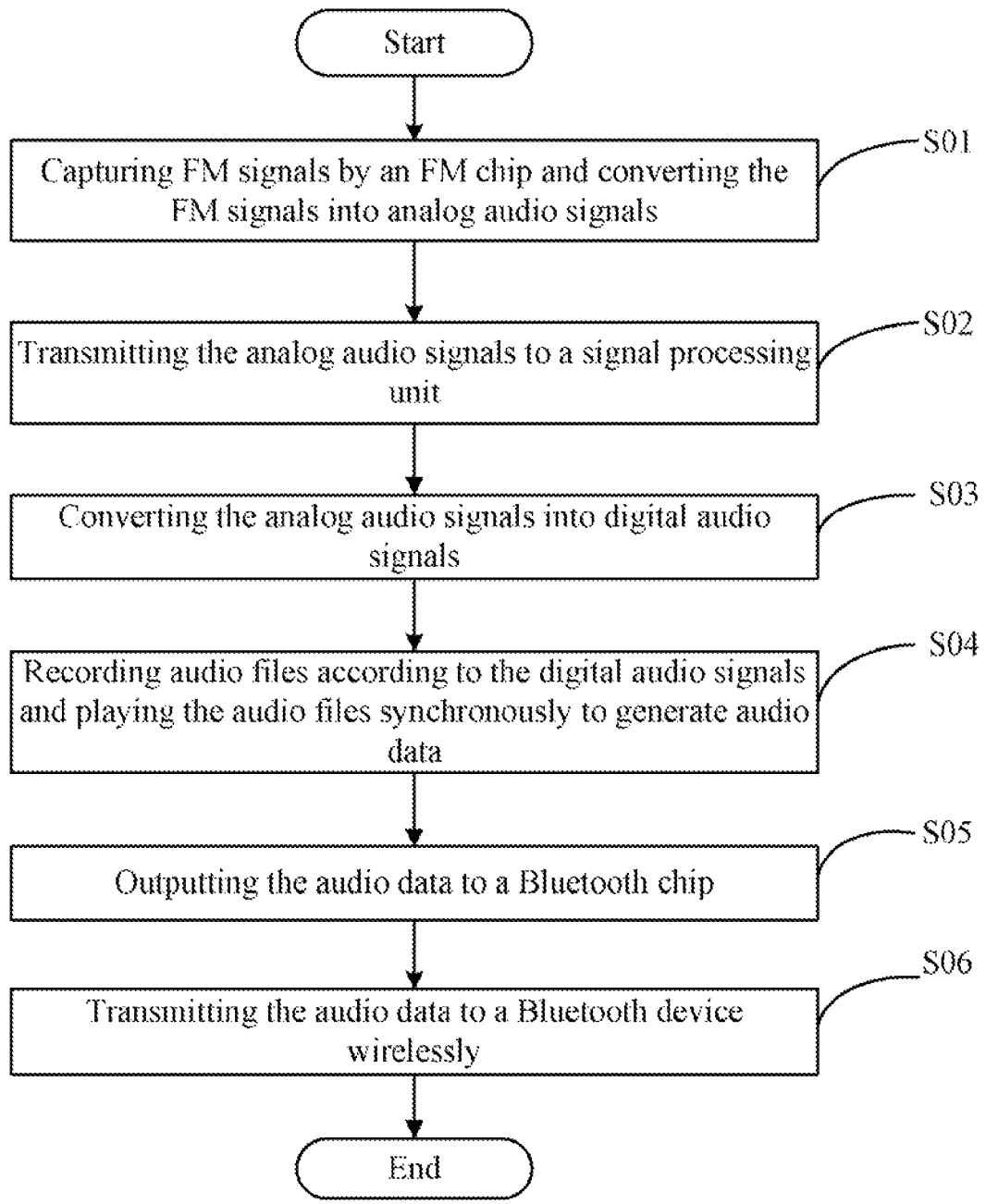
FIG. 4 is a flowchart illustrating one embodiment of a method for listening to FM radio using a Bluetooth device.

FIG. 4 is a flowchart illustrating one embodiment of a method for listening to FM radio using a Bluetooth device. Depending on the embodiment, in FIG. 4, additional blocks may be added, others removed, and the ordering of the blocks may be changed.

In block S01, the FM chip 10 captures FM signals from the broadcasting station 3 and converts the FM signals into analog audio signals.

In block S02, the FM chip 10 transmits the analog audio signals to the receiving module 110 of the signal processing unit 11.

In block S03, the AD converting module 111 of the signal processing unit 11 converts the analog audio signals into digital audio signals. In one embodiment, the AD converting module 111 may be a analog-to-digital converter (ADC).

In block S04, the recording and playing module 112 records audio files according to the digital audio signals and plays the audio files to generate audio data. As mentioned above, after receiving the digital audio signals, the recording and playing module 112 firstly records audio files by registering the digital audio signals into the first data buffer 115. At the same time, the recording and playing module 112 plays the audio files recorded in the first data buffer 115 to generate audio data. When the first data buffer 115 is full, the recording and playing module 112 continues to record audio files by registering the digital audio signals into the second data buffer 116. When of the audio files recorded in the first data buffer 115 have been played, the recording and playing module 112 plays the audio files recorded in the second data buffer 116 immediately. When the second data buffer 116 is full, the recording and playing module 112 continues to record audio files by registering the digital audio signals into the first data buffer 115 over again.

In block S05, the outputting module 113 outputs the audio data to the Bluetooth chip 12.

In block S06, the Bluetooth chip 12 communicates with the Bluetooth device 2 wirelessly to transmit the audio data to the Bluetooth device 2 for outputting FM radio.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, the electronic device comprising a (frequency modulation) FM chip, a signal processing unit, and a Bluetooth chip, the signal processing unit comprising:
   a receiving module operable to receive analog audio signals from the FM chip, wherein the analog audio signals are converted from FM signals received by the FM chip from a broadcast station;
   an analog/digital (AD) converting module operable to convert the analog audio signals into digital audio signals;
   a recording and playing module operable to record audio files according to the digital audio signals and play the audio files synchronously to generate audio data by registering the digital audio signals into a first data buffer and a second first data buffer alternately and repeatedly, playing the audio files recorded in the first data buffer or the second data buffer to generate the audio data; and
   an outputting module operable to output the audio data to the Bluetooth chip, the Bluetooth chip in wireless communication with a Bluetooth device, so as to use the Bluetooth device to listen to the FM radio.

2. The electronic device as described in claim 1, wherein the electronic device is a mobile phone or a notebook computer.

3. The electronic device as described in claim 1, wherein the AD converting module is an analog-to-digital converter.

4. The electronic device as described in claim 1, wherein the Bluetooth device is an advanced audio distribution profile (A2DP) Bluetooth headset.

5. A method for listening to frequency modulation (FM) radio using a Bluetooth device communicating with an electronic device wirelessly, the electronic device comprising an FM chip, a signal processing unit, and a Bluetooth chip, the method comprising:
   (a) capturing FM signals from a broadcast station using the FM chip and converting the FM signals into analog audio signals;
   (b) converting the analog audio signals into digital audio signals using the signal processing unit;
   (c) recording audio files according to the digital audio signals and playing the audio files synchronously to generate audio data using the signal processing unit by registering the digital audio signals into a first data buffer and a second first data buffer alternately and repeatedly, playing the audio files recorded in the first data buffer or the second data buffer to generate the audio data; and
   (d) outputting the audio data to the Bluetooth chip, the Bluetooth chip in wireless communication with the Bluetooth device, for using the Bluetooth device to listen to the FM radio.

6. The method as described in claim 5, wherein the Bluetooth device is an advanced audio distribution profile (A2DP) Bluetooth headset.

7. The method as described in claim 5, wherein the electronic device is a mobile phone or a notebook computer.

8. The method as described in claim 5, wherein block (c) comprises:
   (c1) recording the audio files by registering the digital audio signals into the first data buffer of the electronic device;
   (c2) playing the audio files recorded in the first data buffer to generate audio data;
   (c3) recording audio files by registering the digital audio signals into the second data buffer of the electronic device unceasingly when the first data buffer is full;
   (c4) playing the audio files recorded in the second data buffer to generate audio data when the audio files recorded in the first data buffer has been played; and
   (c5) returning to block (c1) when the second data buffer is full.

9. A non-transitory computer-readable medium having stored thereon instructions that, when executed by an electronic device, cause the electronic device to perform a method for listening to frequency modulation (FM) radio using a Bluetooth device communicating with the electronic device wirelessly, the electronic device comprising an FM chip, a signal processing unit, and a Bluetooth chip, the method comprising:
   (a) capturing FM signals from a broadcast station using the FM chip and converting the FM signals into analog audio signals;
   (b) converting the analog audio signals into digital audio signals using the signal processing unit;
   (c) recording audio files according to the digital audio signals and playing the audio files synchronously to generate audio data using the signal processing unit by registering the digital audio signals into a first data buffer and a second first data buffer alternately and repeatedly, playing the audio files recorded in the first data buffer or the second data buffer to generate the audio data; and (d) outputting the audio data to the Bluetooth chip, the Bluetooth chip in wireless communication with a Bluetooth device, so as to use the Bluetooth device to listen to the FM radio.

10. The non-transitory computer-readable medium as described in claim 9, wherein the Bluetooth device is an advanced audio distribution profile (A2DP) Bluetooth headset.

11. The non-transitory computer-readable medium as described in claim 9, wherein the electronic device is a mobile phone or a notebook computer.

12. The non-transitory computer-readable medium as described in claim 9, wherein block (c) comprises:

(c1) recording audio files by registering the digital audio signals into the first data buffer of the electronic device;

(c2) playing the audio files recorded in the first data buffer to generate audio data;

(c3) recording audio files by registering the digital audio signals into the second data buffer of the electronic device unceasingly when the first data buffer is full;

(c4) playing the audio files recorded in the second data buffer to generate audio data when the audio files recorded in the first data buffer has been played; and (c5) returning to block (c1) when the second data buffer is full.

* * * * *